United States Patent
Higashida

(10) Patent No.: US 6,438,143 B1
(45) Date of Patent: Aug. 20, 2002

(54) IMAGE PACKET COMMUNICATIONS SYSTEM

(75) Inventor: Masaaki Higashida, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/167,496

(22) Filed: Oct. 7, 1998

(30) Foreign Application Priority Data

Oct. 7, 1997 (JP) .............................................. 9-274122

(51) Int. Cl.[7] .............................. H04J 3/06; H04N 9/79
(52) U.S. Cl. ........................................ 370/503; 370/507
(58) Field of Search ................................. 370/503–529, 370/486–490; 386/40, 46, 124

(56) References Cited

U.S. PATENT DOCUMENTS

| | | | |
|---|---|---|---|
| 5,287,182 A | 2/1994 | Haskell et al. | 348/500 |
| 5,386,436 A | 1/1995 | Kawada et al. | 375/106 |
| 5,936,968 A * | 8/1999 | Lyons | 370/503 |
| 6,243,369 B1 * | 6/2000 | Grimwood et al. | 370/355 |
| 6,307,868 B1 * | 10/2000 | Rakib et al. | 370/485 |

FOREIGN PATENT DOCUMENTS

| | | |
|---|---|---|
| GB | 2 293 292 | 3/1996 |
| JP | 5-14399 | 1/1993 |
| JP | 5-14763 | 1/1993 |

OTHER PUBLICATIONS

Merayo L.A. et al., "Service Clock Recovering in CBR Services; Adaptative vs. SRTS", Broadband Communications, Global Infrastructure for the Information Age, Proceedings of the International IFIP–IEEE Conference on Broadband Communications, Canada, 1996, Apr. 1996, pp. 608–616.

* cited by examiner

Primary Examiner—Melvin Marcelo
Assistant Examiner—Ron Abelson
(74) Attorney, Agent, or Firm—Wenderoth, Lind & Ponack, L.L.P.

(57) ABSTRACT

In a transmitter side of an image packet communications system, a transmission clock signal is generated subordinately synchronized to a reference clock signal. Based on the transmission clock signal, a transmission standard signal is generated as synchronous with the reference clock signal. Further, a packet generator generates image packets based on the timing of the transmission clock signal with reference to the transmission standard signal, with image packet headers attached thereto. In a receiver side of the image packet communications system, a reception clock signal is generated subordinately synchronized to the reference clock signal, so that the reception clock signal is synchronized with the transmission clock signal. A packet receiver separates the image packet headers from the image packets, and the buffer controller generates a reception standard signal with reference to the image packet headers based on the reception clock signal, thereby controlling the writing and reading operation of the image packets to and from a buffer group. Thus, the transmitter and receiver can be stably synchronized, despite occurrence of errors or packet losses, with simple configuration.

8 Claims, 11 Drawing Sheets

IMAGE PACKET COMMUNICATIONS SYSTEM

BACKGROUND OF THE INVENTION

1. Field of the Invention

The present invention relates to a packet communications system, and more particularly to a communications system for sending and receiving image information and other information in real time over a high-speed packet network synchronizing between a transmitter side and a receiver side.

2. Description of the Prior Art

In recent years, development of communications systems using optical fibers and other high speed transmission paths has greatly increased communication capacity. This has spurred the development of digital communications systems, which are now used not only for digital computer data but also for transmitting digitized image signals, audio signals, and related additional information.

Asynchronous transfer mode (ATM) systems, for example, can operate at a speed in excess of 155 megabits/second, and practical ATM systems are now available for communicating digital image data in real time.

Formal standards for ATM systems have been adopted by the International Telecommunication Union-Telecommunication Standardization Sector (ITU-T) and the ATM Forum, for example, and numerous related publications have been issued.

Such image communications systems employing high-speed packet networks are disclosed in, for example, Japanese Patent Laid-open Publication 5-14763, in gazette, as a first reference, Japanese Patent Laid-open Publication 5-14399, in gazette, as a second reference, and U.S. Pat. No. 5,386,436, as a third reference.

According to the first reference, clocks at transmitter and receiver terminals are synchronized in subordination to a network clock of a high-speed packet network. On the transmitter terminal, image data are transmitted in conjunction with transmission frame synchronizing signals that are generated based on the subordinately synchronized clock.

On the receiver terminal, meanwhile, reproduction-side synchronization is effected on the frames using both reception frame synchronizing signals generated on the basis of a subordinately synchronized clock and transmission-reproduction frame synchronizing signals generated on the basis of timing packets added to the transmission image packets.

In the disclosure of the second reference, synchronization packets added to transmitted image signals are detected on the receiver terminal, as in the first reference, and image frame synchronizing signals and image clocks are generated from moving averages of arrival times of the synchronizing information based on the synchronization packets, and the synchronization of image frames is thereby achieved.

The third reference provides a synchronization method using statistical characteristics of adaptive differential PCM (ADPCM) signals constituting transmission data.

The configurations described in the forgoing conventional systems, however, are subject to following problems.

As concerning the first reference:

(1) The transmission-reproduction frame synchronization signal (FST1) generated by a timing control means is generated based on a timing packet (PT), and therefore, when a PT cannot be detected because of an error such as a cell loss or packet destruction on the ATM network occurring on the packet communications network, the frame synchronization signal FST1 cannot be generated normally. Thus, image data cannot be stored in a frame memory unit, which leads to the breakdown of the image.

(2) Also, intervals between timing packet receptions are not constant due to the influence of fluctuations on the ATM networks, etc., and therefore, there may be a problematic case where synchronization cannot be achieved because of the effects of network characteristics.

(3) Moreover, the system cited in the first reference will not function without the timing control means, resulting in very large circuit sizes.

As concerning the second reference:

(4) Image frame synchronizing signals are generated using an arrival time calculation means, moving average calculation means, observation window setting means, and frame synchronizing signal generation means, but this is all dependent on the synchronization packet Ps. Accordingly, although some degree of resilience to both packet destruction and fluctuations is effected by taking of moving averages, in the event that synchronization packets Ps are continually destroyed, for example, and if a limiting value thereof is exceeded, the images will break down.

(5) Moreover, the arrival time calculation means, moving average calculation means, observation window setting means, and frame synchronizing signal generation means are circuits involved in computations and thus result in a system having a very large circuit size.

(6) According to both the first and the second references, moreover, there is only one timing packet Pt or one synchronization packet Ps in one frame period, so that, when these are destroyed, it becomes impossible to receive any of the image data in the frame period, resulting in that the error is compounded.

The fundamental problem with the conventional systems disclosed in the first and the second references resides in the fact that the synchronization signals are generated on the receiver side based on unstable synchronization packets which have been detected on the receiver side.

In the conventional system disclosed in the third reference, unlike the art cited in the first and second references, there is no dependency on unstable synchronization packets, but there is a problem nevertheless in that this system only applies to a case where the data being communicated are adaptive differential PCM (ADPCM) signals.

SUMMARY OF THE INVENTION

The present invention has been developed to solve the problems inherent to the conventional systems, and an essential object of the present invention is to provide an improvement of an image packet communications system.

In the first aspect of the present invention, provided is an image packet communications system for communicating image data information in real time between a transmitter side and a receiver side through a network, wherein the transmitter comprises:

a transmission clock generator for generating a transmission clock subordinately synchronized to a given reference clock; and a packet generator for generating image packets from input image signals based on the transmission clock, meanwhile, the receiver comprises:

a reception clock generator for generating a reception clock subordinately synchronized to the given reference clock, so that the reception clock is synchronized with the transmission clock;

a packet receiver receiving the image packets with a network delay to be stored in a buffer memory group; and a buffer controller for generating a reception standard signal as a control signal for controlling the writing and reading of the image packets to and from the buffer memory group, based on the reception clock.

In this arrangement, the transmitter further comprises a transmission standard signal generator for generating a transmission standard signal based on the transmission clock and the packet generator generates the image packets with image packet headers attached thereto to produce transmission packets, with reference to the transmission standard signal, and wherein the packet receiver is comprised of a separator means for separating the image packets and the image packet headers from each other so that the buffer controller generates an address signal based on information of the image packet headers supplied from the packet receiver.

In the second aspect of the present invention, the buffer controller is supplied with a reference signal (REF) from the outside as a frame standard signal, and when detecting that a time differential between the reception standard signal generated based on the reception clock and the reference signal (REF) input from the outside exceeds a predetermined value, the writing and reading of the image packets to and from the buffer memory group is so controlled such that the image data output from the buffer memory group has a suitable volume for the reference signal.

In the third aspect of the present invention, the transmitter further comprises a buffer memory group for storing the input image signals and a buffer controller for controlling the writing and reading of the image signals to and from the buffer memory group, and wherein the buffer controller is supplied with a reference signal (REF) from the outside as a frame standard signal, and when detecting that a time differential between the transmission standard signal generated by the transmission standard signal generator and the reference signal (REF) input from the outside exceeds a predetermined value, the writing and reading of the input image signals to and from the buffer memory group is so controlled such. that the image data output from the buffer memory group has a suitable volume for the reference signal.

In the fourth aspect of the present invention, the network is comprised of one or more packet switching devices, each packet switching device including:

a plurality of transceivers for transmitting and receiving image data packets; and a switch standard signal generator for selecting any transceiver from among a plurality of the transceivers, and generating switch standard signals from the image packet signals received by the transceiver, so that the switch standard signals are subordinately synchronized to the transmission standard signal generated by the transmission standard signal generator, thereby subordinately synchronizing any of the selected transceiver to the transmission standard signal, whereby the transmission packets are transmitted to the network with the timing subordinately synchronized to the transmission standard signal.

In the fifth aspect of the present invention, the packet generator completes the transmissions of the image packets and packet headers belonging within a period of said transmission standard signal, within a time period obtained by subtracting the maximum network fluctuation from said transmission standard signal.

According to the first aspect of the present invention, transmissions are conducted with a clock subordinately synchronized to the network clock and frame signals generated based on the clock established as the synchronization standard at the transmitter terminal, and in the meanwhile, transmissions are conducted with a clock subordinately synchronized to the network clock and frame signals generated based on the clock established as the synchronization standard at the receiver end, thus affording the benefit of being able to build a communications system where the synchronization between the transmitter end and the receiver end can be guaranteed.

Furthermore, the image packets are transmitted after attaching image packet headers thereto, wherefore, even when a packet loss or error occurs in the network, and a transmission packet is lost, that transmission packet error has no effect on the other transmission packets, and normally received transmission packets are securely received and output. Accordingly, an effect is afforded in that high image quality can be maintained. in the transmissions even when packet losses or errors occur.

According to the second aspect of the present invention, when the synchronization period of the network clock in the high-speed packet network differs from the period of the reference signal at the receiver side, it is possible to adjust the image data volume so that the image data received from the network are made suitable to the reference signal period. Accordingly, it is possible to build systems wherein equipment synchronized to the network clock is connected to equipment synchronized to the reference signal, thereby affording the effect of being able to guarantee frame synchronization for all equipment in the system.

According to the third aspect of the present invention, when the synchronization period of the network clock in the high-speed packet network differs from the period of the reference signal, the volume of image data can be adjusted so that the image data input synchronized to the reference signal are made suitable to the period of the network clock. This makes it possible to interconnect equipment synchronized to the reference signal and equipment synchronized to the network clock, thus affording the effect of being able to guarantee the frame synchronization of all equipment in the system. The image data volume is adjusted in frame units, so that high image quality can be preserved.

According to the fourth aspect of the present invention, it is possible to build an image packet communications system assuring the frame synchronization of all equipment included in the transmitter, the high-speed packet network, and the receiver, thereby affording the effect of maintaining high image quality.

According to the fifth aspect of the present invention, the image data in each frame are transmitted without fail within the frame period, even when fluctuations occur in the high-speed packet network, thereby affording the effect of realizing an image packet communications system assuring high image quality.

The first, second, third, fourth, and fifth aspects of the present invention all afford the benefit of being realizable in a simple configuration. Furthermore, the present invention can be implemented without detecting any kind of signal from the data, thus providing the benefit of being applicable irrespective of the data being communicated.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:.

DESCRIPTION OF THE PREFERRED EMBODIMENTS

Detailed descriptions of the embodiments of the present invention are now given, making reference to the accompanying drawings.

In the present invention, ATM (asynchronous transfer mode) communications are taken as an example of a high-speed packet network. An exemplary ATM standard conforms to any of the following but shall not be limited to: ITU-T, Q.2931; ITU-T, I.363; and ATM User-Network Interface Specification Version 3.0 (UNI3.0), Version 3.1 (UNI3.1), or Version 4.0 (UNI4.0), of The ATM Forum.

In the present invention, a transfer capacity of 155 megabits per second is taken as an example. Moreover, the specifications for SONET (Synchronous Optical Network), adopted by the ATM at the physical level, are set forth by the American National Standards Institute (ANSI) in T1E1.2/94-002R1 and T1.105.

The examples used for the data in communication are image data, audio data, and additional information, based on specifications for a commercial digital VCR.

The commercial digital VCR specification taken as an example is the "DVC Specification" agreed upon by the HD Digital VCR Conference.

The DVC specification is set forth in "Specifications of Consumer-Use Digital VCRs Using 6.3 mm Magnetic Tape," HD Digital VCR Conference, December, 1994 (hereinafter referred to as Reference 4). The specifications for the digital interface thereof are set forth in "Specifications of Digital Interface for Consumer Electric Audio/Video Equipment," HD Digital VCR Conference, December, 1995 (hereinafter referred to as Reference 5). As also set forth in Reference 5, the transfer capacity of the digital interface in the DVC specification is 28.8 megabits per second (i.e., 120 kilobytes per frame), inclusive of audio data and additional information.

In the present invention, the description is made in a case of assuming that DVC-specification data are communicated in frame units. Therefore, in the present invention, in terms of input image signals and output image signals, the system transmits 120 kilobytes in one frame period.

With the DVC standard, furthermore, both audio signals and additional signals are handled simultaneously with image signals. These signals are transmitted in a superimposed or multiplexed state in the image signals, referenced to the short time unit (frame time) of the image signals. Thus, every signal is described in terms of the image signals. It is noted, however, here that the transmission data is not limited to DVC-specification data and the system may use a transmission time unit other than the frame unit, such as the field unit or some other time unit.

First Embodiment

A first embodiment is now described with reference to FIGS. 1 to 3.

Figure 1:
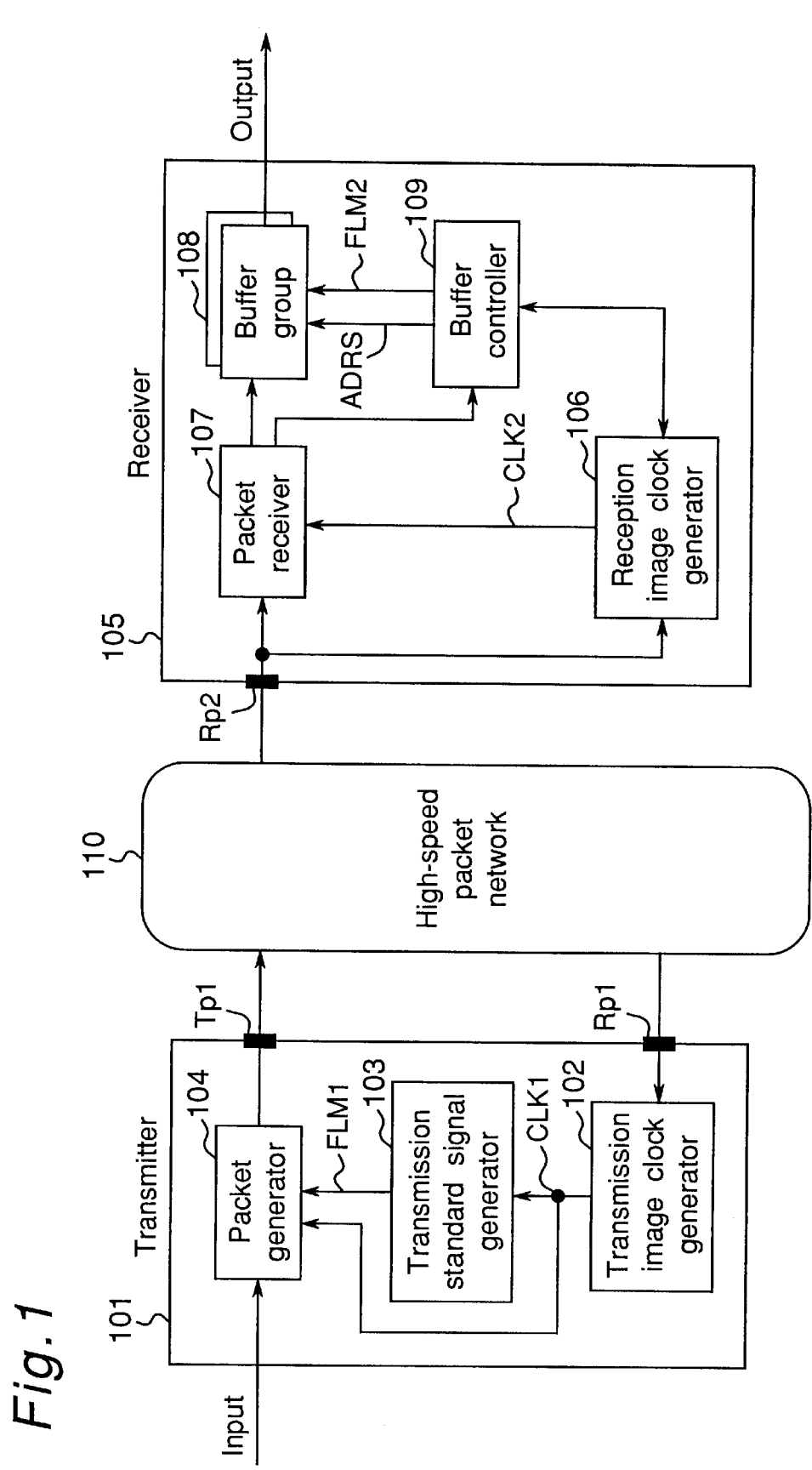
FIG. 1 is a schematic block diagram of an image packet communications system according to a first embodiment of the present invention.

FIG. 1 shows a schematic construction of an image packet communications system of the first embodiment, where a transmitter 101 is fed with input image signals and converts them into packets (ATM cells), and sends out the ATM cell packets over the ATM network. The transmitter 101 includes a transmission image clock generator 102, transmission standard signal generator 103, and packet generator 104. In this arrangement, for example, image signals based on the DVC specification are used as the input signals applied to the transmitter 101.

A receiver 105 reconfigures image signals from the packets (ATM cells) received from the ATM network. The receiver 105 includes a reception image clock generator 106, packet receiver 107, a buffer group unit 108, and buffer controller 109.

Reference numeral 110 denotes a high-speed packet network, which is comprised of, for example, an ATM network configured with ATM changeover switching devices (ATM switches) in the embodiments of the present invention. The transmitter 101 and the receiver 105 are connected through the high-speed packet network 110. The high-speed packet network 110 is synchronized throughout the entire network. In the embodiments of the present invention, ATM communications are effected on the premise that the SONET specification, for example, is used as a physical layer thereof. According to the SONET, a SONET frame made up of 9×270 bytes is transmitted every 125 microseconds. Therefore, the high-speed packet network 110 is synchronized with reference to 125-microsecond signals. Hereinafter, a clock synchronized to a SONET frame is called as "network clock".

In FIG. 1, single connecting ports between the transmitter 101 and the high-speed packet network 110 are labeled as Tp1 and Rp1. The ATM communications are full duplex communications, with two ports for sending and receiving at each port. In other words, Tp1 (for sending) and Rp1 (for receiving) constitute one pair. A single connecting port between the receiver 105 and the high-speed packet network 110 is labeled Rp2. In practice, there is also a sending port paired with the receiving port Rp2, but it is not indicated in FIG. 1 for brevity.

In the transmitter 101, the transmission image clock generator 102 generates a transmission image clock CLK1 that is subordinately synchronized to a network clock applied through the terminal port Rp1 from the high-speed packet network. Thus, the transmission image clock is generated based on the network clock which is network-synchronized. A SONET frame is detected every 125 microseconds for the data received through the port Rp1, and therefore, by using PLL circuitry, it is easy to generate a clock (CLK1) that is subordinated to the network synchronization.

The transmission standard signal generator 103 generates, based on the transmission image clock CLK1, a transmission synchronous frame signal (FLM1) serving as a transmission standard signal. Accordingly, the transmission synchronous frame signal (FLM1) is an accurate frame signal that is synchronized with the network clock, where the frame signal FLM1 can be easily configured using a counter (not shown).

It is noted here that the transmission standard signal generator means 103 may be included in the transmission image clock generator 102.

The transmission image clock CLK1 is also applied to the packet generator 104, so that the packet generator 104 generates image packets from the input image signals based on the timing of the transmission image clock CLK1, using the frame signal FLM1 as a frame reference. Then, the packet generator 104 attaches image packet headers to the image packets, and the resultant image packets are sent out to the network through the Tp1 port with the timing synchronized to the SONET frame. In this arrangement, it goes without saying that the ports Tp1 and Rp1 are synchronized with each other.

Meanwhile, in the receiver 105, the reception image clock generator 106 generates a reception image clock (CLK2) that is subordinately synchronized to the network clock, just as the transmission image clock generator 102, based on the synchronized network clock input through the Rp2 port. Since the reception clock CLK2 is subordinately synchronized to the network clock, therefore, the reception clock is synchronized with the transmission image clock CLK1.

The packet receiver 107 separates the image packet headers from the image packets received through the Rp2 port, and sends the image packet headers to the buffer controller 109, while sending the image packets to the buffer group 108. In the embodiments of the present invention, since it is assumed that image signals are sent, for example, in frame units, therefore the buffer group 108 is made up of frame memories.

Upon receipt of the image packet headers, the buffer controller 109 generates addresses (ADRS) in the frame memories for storing the received image packets, and also generates a frame signal (FLM2) for switching between the two frame memories and effecting the frame timing. The addresses ADRS and frame signal FLM2 are applied to the buffer group 108 for controlling the writing and reading operation of the image packets to and from the buffer group 108.

The buffer group 108, based on the addresses ADRS and frame signal FLM2, stores one frame of image data, and outputs those data as output image signals. The frame memories of the buffer group 108 having the double memory structure, are switched over with every frame between storing of the received image packets and generating of the image data stored in frame units.

Figure 2:
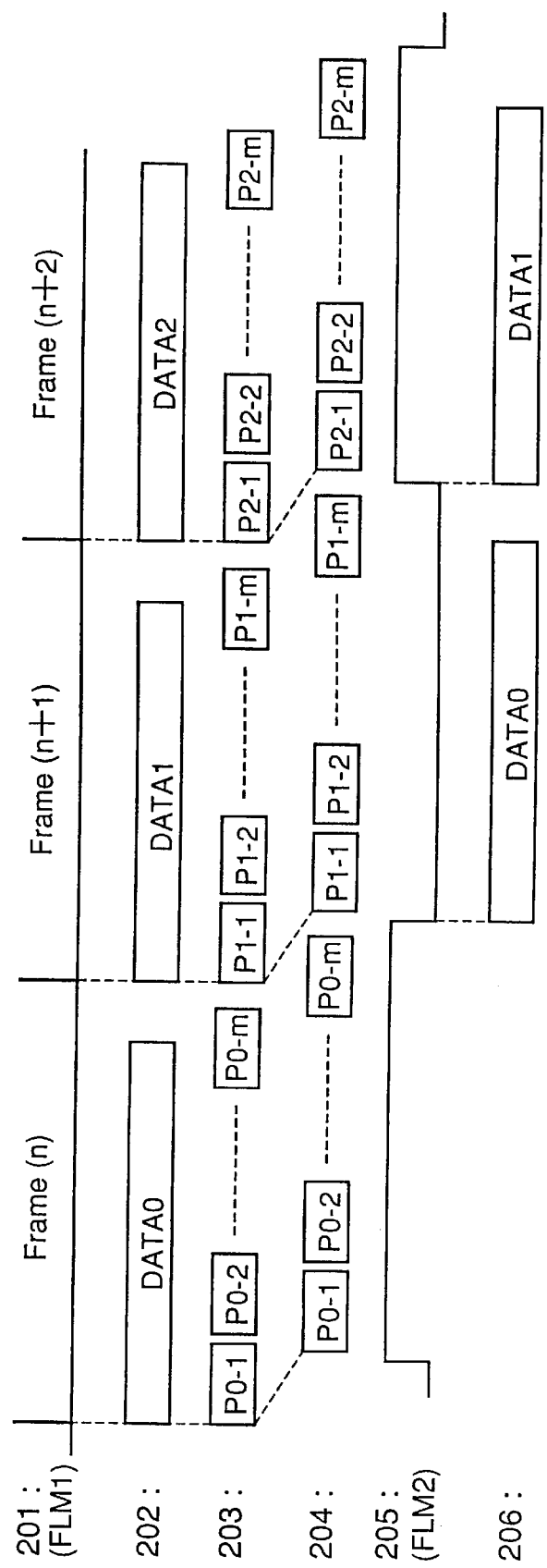
FIG. 2 is a timing chart for explaining the operations of the image packet communications system of the first embodiment.

FIG. 2 shows a timing chart representing the operations of the image packet communications system. The operations of the system shown in FIG. 1 are now described in detail with reference to FIG. 2.

In FIG. 2, reference numeral 201 denotes a transmission synchronous frame signal (FLM1), and 202 denotes an input image signal. The data volume of the input image signal is fixed for each frame, and is inputted to the transmitter 101 synchronously with the transmission synchronous frame signal FLM1. Reference numeral 203 represents the state resulting from separating one frame of the input image signal 202 into a plurality of packets, with an image packet header added to each image packet. Hereinafter, each packet having an image packet header added thereto is called as "transmission packet", which the transmission packets are represented by P0-1, P0-2, and so on.

Figure 3:
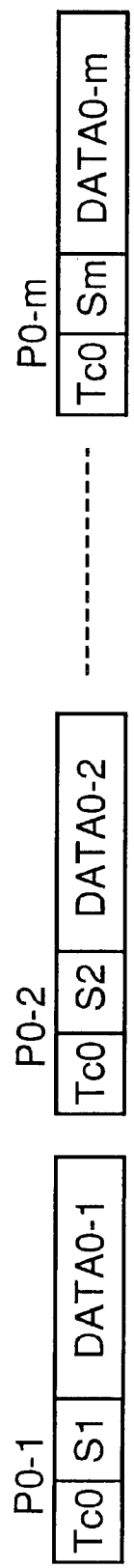
FIG. 3 is a schematic diagram showing a constitution of a transmission packet.

FIG. 3 shows the details of the transmission packets, where one frame of image data (DATA0) for, e.g., Frame (n) is shown in a state as divided into m pieces of transmission packets. The image data DATA0 of one frame (n) is divided into m image packets (DATA0-1 to DATA0-m), a time code T0 is attached at the head of each image packet, and, subsequently to the time code Tc0, sequence numbers S1 to Sm of each packet in the frame are attached to the image packets (P0-1 to P0-m), respectively, in this order.

The time code (Tc0, Tc1, Tc2, . . . ) is configured as HH hours MM minutes SS seconds and FF frame (hereinafter represented as HH:MM:SS:FF frame). If the n-th frame is 01:02:03:00, then the (n+1)th frame will be 01:02:03:01, the (n+2)th frame will be 01:02:03:02, and so forth, increasing with each frame. In this way each frame number to which each transmission packet belongs can be specified. As the time code Tc0 in case of Frame (n) shown in FIG. 3, attached is the same value, namely, 01:02:03:00.

The sequence numbers S1 to Sm may be assigned from 1 to m, for example. In this case, S1 is numbered 1; S2 is numbered 2, increasing in order until Sm is numbered m. The transmission packets in a frame can be specified by means of these sequence numbers.

By the configuration shown in FIG. 3, it is possible to specify the frames to which each transmission packet belongs and to specify the image positions inside the frames even when a transmission packet becomes erroneous due to a cell loss, etc., in the ATM network.

Referring back to FIG. 2, reference numeral 204 denotes transmission packets received by the receiver 105. The transmission packets 204 in the receiver side are delayed behind the transmission packets 203 in the transmitter side by the amount of network delay.

Reference numeral 205 denotes a frame signal (FLM2) output from the buffer controller 109. The method of generating the frame signal 205 (FLM2) can be attained by detecting frame boundaries of transmission packets sent from the packet receiver 107. Provision may be made, for example, so that the logic is reversed between the end of the reception of the final transmission packet P0-m of the n-th frame and the leading transmission packet P1-1 of the (n+1)th frame. More specifically, the only need is to reverse the logic after the last bit in P0-m is detected. It is also permissible at this time to reverse the logic after a delay of several clock beats following the detection of the last bit, whereby control signals FLM2 (i.e., 205) can be generated which are resistant to fluctuation effects.

Another permissible method of generating FLM2 is to provide a buffer and thereby delay the image packets when the image packets are transferred from the packet receiver 107 to the buffer group 108, while, when transferring image packet headers from the packet receiver 107 to the buffer controller 109, making those transfers without delay, and causing the logic of FLM2 to be reversed by the next clock beat after detecting the beginning of a frame, such as P1-1, in the buffer controller 109.

The receiver 105 is subordinately-synchronized to the network clock, and therefore, once a frame boundary is detected, the frame signal 205 (FLM2) can easily be generated by turning a counter. It is also possible to make fine phase adjustment in the frame signal FLM2 by making adjustment of a counter decoding value. What is important in the present invention is that, because the frame signal FLM2 is generated with reference to the clock CLK2 that is subordinately synchronized to the network clock, therefore stable frame signals are generated, which are not dependent on timing signals contained in the received packets.

It is noted here that the means of generating the reception standard frame signal FLM2 (205) may be provided in the reception image clock generator 106.

Reference numeral 206 denotes the output image signals output from the receiver 105. The images are output by reading out data of every one frame from the frame memories 108, with reference to the frame signal FM2.

The write and read-out switching of two sheets of frame memories can be accomplished using the frame signal FLM2, setting the logic of the two frame memory write and read-out enabling signals in opposition.

The addresses (ADRS) for writing the image packets of each frame to the buffer group 108 can specify transmission packets in each frame by reference to the sequence number of the image packet header, so that proper storage positions thereof can easily be specified, and therefore the write address can be generated by a simple circuit. Meanwhile, the read-out addresses can be generated by providing, for example, a counter in the buffer group 108, resetting the counter at the leading edge of each frame, referencing the frame signal (FLM2), and increasing the count value in order.

Although not indicated in FIG. 1, a write enabling signal is output to the buffer group 108 from the buffer controller 109, so that images are written to the buffer group memories only when a valid image packet is input to the buffer group 108.

Thus, in the first embodiment, in the transmitter (101) side, the transmission clock CLK1 is generated subordinately synchronized to a reference network clock, and based on the transmission clock CLK1, the transmission standard frame signal (FLM1) is generated as being synchronous with the reference network clock, so that the packet generator 104 generates image packets based on the timing of the transmission clock CLK1 with reference to the transmission standard frame signal FLM1, while attaching image packet headers to the image packets, and the resultant image packets are sent out to the packet receiver 107 provided in the receiver 105 via the network.

Then, in the receiver 105, the reception clock (CLK2) is generated subordinately synchronized to the reference network clock, and therefore the reception clock (CLK2) is synchronized with the transmission clock (CLK1). The packet receiver 107 separates the image packet headers from the image packets, and the buffer controller 109 generates the reception standard frame signal (FLM2) with reference to the image packet headers based on the reception clock CLK2, so that the buffer group 108 controls the writing and reading operation of the image packets.

Thus, in the packet communications network, the sending and receiving ends can be stably synchronized, despite occurrence of errors or packet losses, with simple configuration of the equipment.

As explained in the foregoing, with the first embodiment, transmissions are conducted with reference to a clock (CLK1) subordinately synchronized to the network clock at the transmitter side and with reference to a frame signal (FLM1) generated based on the clock CLK1, and in the meanwhile, with reference to a clock (CLK2) subordinately synchronized to the network clock at the receiver side and with reference to a frame signal (FLM2) generated based on the clock CLK2, thereby allowing image transmissions wherein the synchronization between the transmitter and receiver terminals is guaranteed. This is due to the fact that the configuration does not involve regenerating frame signals in dependence on timing packets detected from transmission packets.

Also, because a frame number and sequence number are added to each transmission packet, respectively, even if a cell loss, etc., occurs in the network, or a transmission packet be lost (error), the transmission packet error will not have any effect on other transmission packets, and the image packets in transmission packets received normally will be written normally to the frame memories. As a result, even should errors occur in the packet network, transmissions are nevertheless possible with high image quality maintained.

Also, there is no need to have a circuitry for reproducing frame signals from timing packets detected from transmitted packets, and therefore, the system can be implemented with a simple configuration.

The transmission packet configuration described with reference to FIG. 2 and FIG. 3 is used in all of the embodiments in the present application.

Second Embodiment

A second embodiment is now described with reference to FIGS. 4 to 6.

Figure 4:
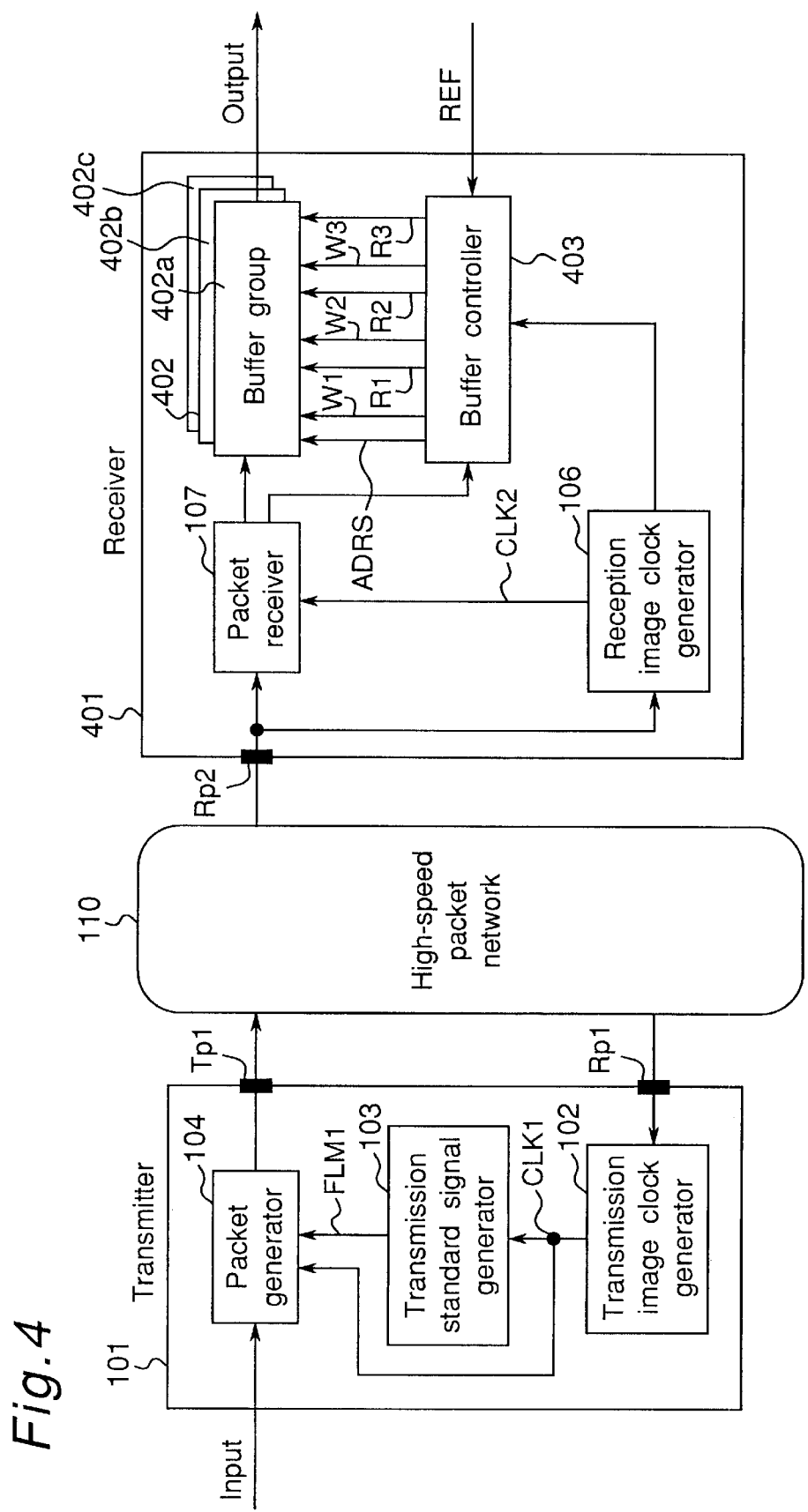
FIG. 4 is a schematic block diagram of an image packet communications system according to a second embodiment of the present invention.

FIG. 4 shows a schematic construction of an image packet communications system in the second embodiment of the present invention, where a transmitter 101 is the same as that in FIG. 1, and a high-speed packet network 110 is the same as that in FIG. 1, while only a receiver 401 is different in construction from that of the first embodiment.

The transmitter 101 and the receiver 401 are connected through the high-speed packet network 110 which is synchronized throughout the entire network, as explained with reference to FIG. 1.

In the receiver 401, the reception image clock generator 106 and the packet receiver 107 are the same as those described in conjunction with FIG. 1. Reference numeral 402 denotes a buffer group which is made up of three frame memories. These frame memories are hereinafter referred to as the first frame memory (402*a*), second frame memory (402*b*), and third frame memory (402*c*).

A buffer controller 403 generates, based on image packet headers input thereto, addresses (ADRS) for the frame memories in which the image packets received from the packet receiver 107 are stored. The buffer controller 403 also generates write enable signals (W1, W2, W3) and read enable signals (R1, R2, R3) for the three frame memories, respectively, to thereby control the writing and reading out of image packets to and from the buffer group 402.

A reference signal REF is input to the buffer controller 403 from the outside. This reference signal REF may be a composite sync signal or other frame standard signal. In a broadcast station and the like, for example, all hardware in the station is synchronized with composite sync. The configuration shown in FIG. 4 corresponds to the case of a broadcast station where all hardware in the station is synchronized with the reference signal REF, and where image signals are received by the receiver 401 from a WAN or other packet communications network (high-speed packet network 110). In some cases the periods of the reference signal REF and of the frame signals generated based on the clock subordinately synchronized to the packet communications network 110 will not be exactly the same, but will reflect a slight error due to a precision of a liquid crystal oscillator and such environmental factors as temperature.

The second embodiment of the present invention is to provide a communications system, solving a problem even in the case where the periods of the reference signal and the frame signal are not exactly the same.

Each of the frame memories 402a, 402ba and 402c in the buffer group 402 stores the received image packets in frame units, and generates the image data stored in frames, in frame units. Writing to and reading out from the three frame memories are controlled by ADRS and enabling signals for the three frame memories, namely write enable W1 and read enable R1 for the first frame memory 402a, write enable W2 and read enable R2 for the second frame memory 402b, and write enable W3 and read enable R3 for the third frame memory 402c.

The transmitter 101 is indicated in FIG. 4, but the essence of the present invention is in the construction of the receiver 401, so it is not dependent on the configuration of the transmitter.

Figure 5:
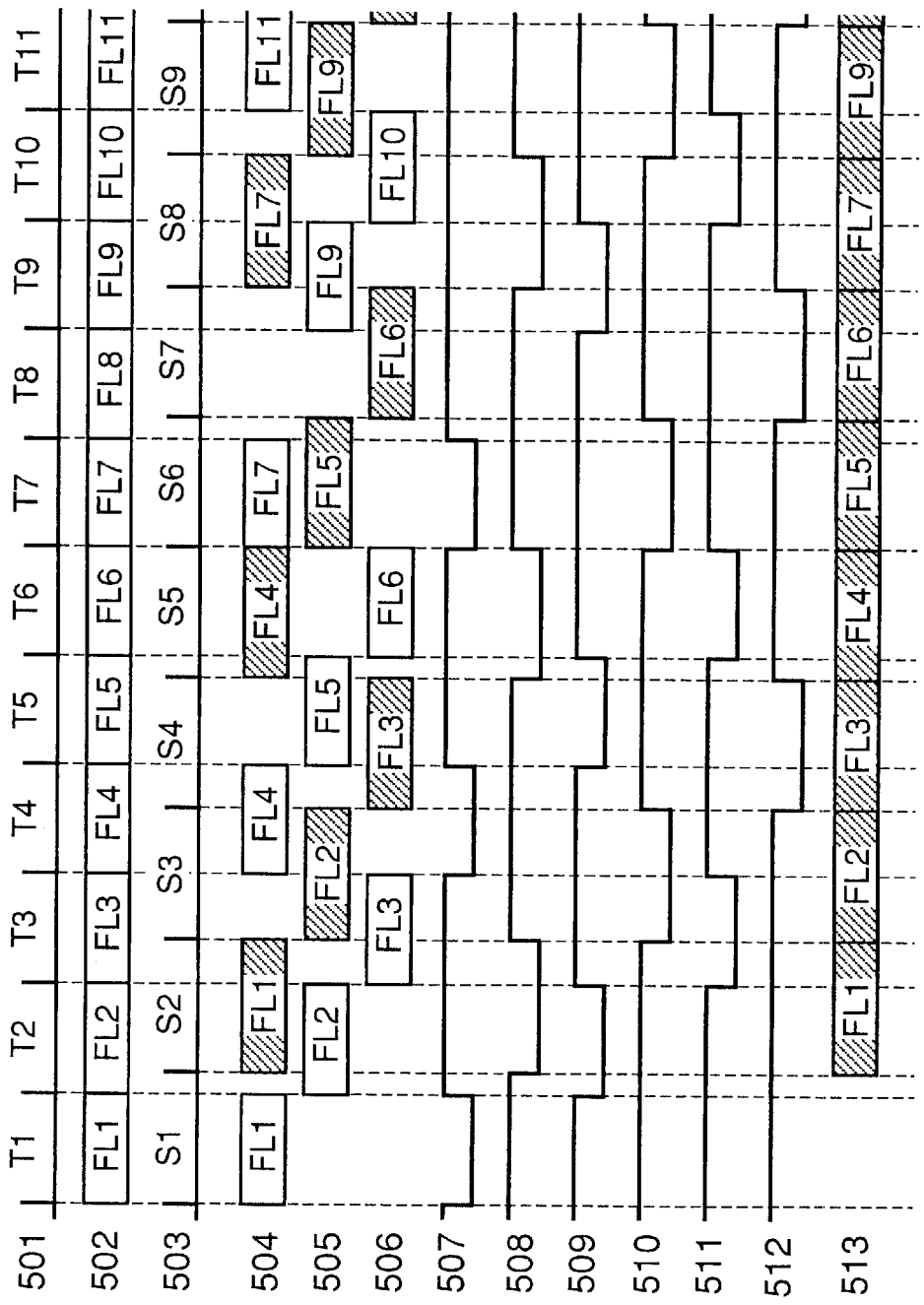
FIG. 5 is a first timing chart for explaining the operations of the image packet communications system of the second embodiment.

FIG. 5 is a first timing chart representing operations of the image packet communications system in the second embodiment. The operation of the system shown in FIG. 4 is next described in detail with reference to FIG. 5.

In FIG. 5, reference numeral 501 denotes receiver side frame signals (reception standard signals) generated by the buffer controller 403, using a counter, based on the clock synchronized with the high-speed packet network 110, which the synchronized clock is generated by the reception image clock generator 106. The intervals or periods of the frames 501 are designated by symbols T1 to T11.

Reference numeral 502 denotes image packets transferred to the buffer group 402 from the packet receiver 107. Numeral 503 denotes frame signals (hereinafter called "reference frame signals") which are generated by the buffer controller 403 based on the reference signal REF. The reference frame signals 503 can be readily generated by circuitry employing PLL and a composite sync vertical interval detection circuit. The intervals or periods of the reference frame signals 503 are designated by symbols S1 to S9.

In the state indicated in FIG. 5, the period of the reference frame signal 503 is longer than that of the reception standard signal 501. Numeral 504 represents write and read states for the first frame memory 402a, numeral 505 represents write and read states for the second frame memory 402b, and numeral 506 represents write and read states for the third frame memory 402c, where the read states in 504, 505, and 506 are indicated by hatching.

Reference numeral 507 denotes the write enable signal W1 for the first frame memory 402a, numeral 508 denotes the read enable signal R1 for the first frame memory, numeral 509 denotes the write enable signal W2 for the second frame memory 402b, numeral 510 denotes the read enable signal R2 for the second frame memory, numeral 511 denotes the write enable signal W3 for the third frame memory 402c, and numeral 512 denotes the read enable signal R3 for the third frame memory. The enable states in all of these enabling signals are the low level.

Reference numeral 513 represents the output image signals read out from the buffer group 402.

The image packets 502 are written to the frame memories, sequentially from the first to the third frame memories, by the write enable signals W1, W2, and W3 generated with reference to the reception standard signal 501. Read-outs are executed from the frame memories, sequentially from the first to the third memories, by the read enable signals R1, R2, and R3 generated with reference to the reference frame signal 503.

Given the state shown in FIG. 5, however, the period of the reference frame signal 503 is longer than that of the reception standard signal 501, and therefore the read-out is out of time. In other words, in FIG. 5, the FL7 write operation ends at T7, and, in the normal state, at T8 the FL8 write state to the second frame memory is set up, but, since the start of T8 overlaps into the S6 period, at the beginning of T8 the FL5 read-out from the second frame memory has not finished, and therefore the write operations cannot be done. All of the other frame memories are also in a read-wait state. That is, the write operation of the FL8 image packet is not performed. In other words, all of the write enable signals (W1, W2, W3) during the period T8 are controlled so that the logic goes high (i.e., disable state). That is, by reducing the number of image data being written, the number of data is matched with the reference frame signal 503.

Next, during the period T9, since the write operation to the second frame memory has finished, so writing is resumed with the signal 509 (W2) set in the enable state.

Thus, when all of the frame memories are in a state where writing is disabled, control is implemented so that the image packets for one frame is not written, thereby gaining enough time for the read-out operation, and the image signal volume is adjusted so as to be appropriate for the reference frame signal.

Figure 6:
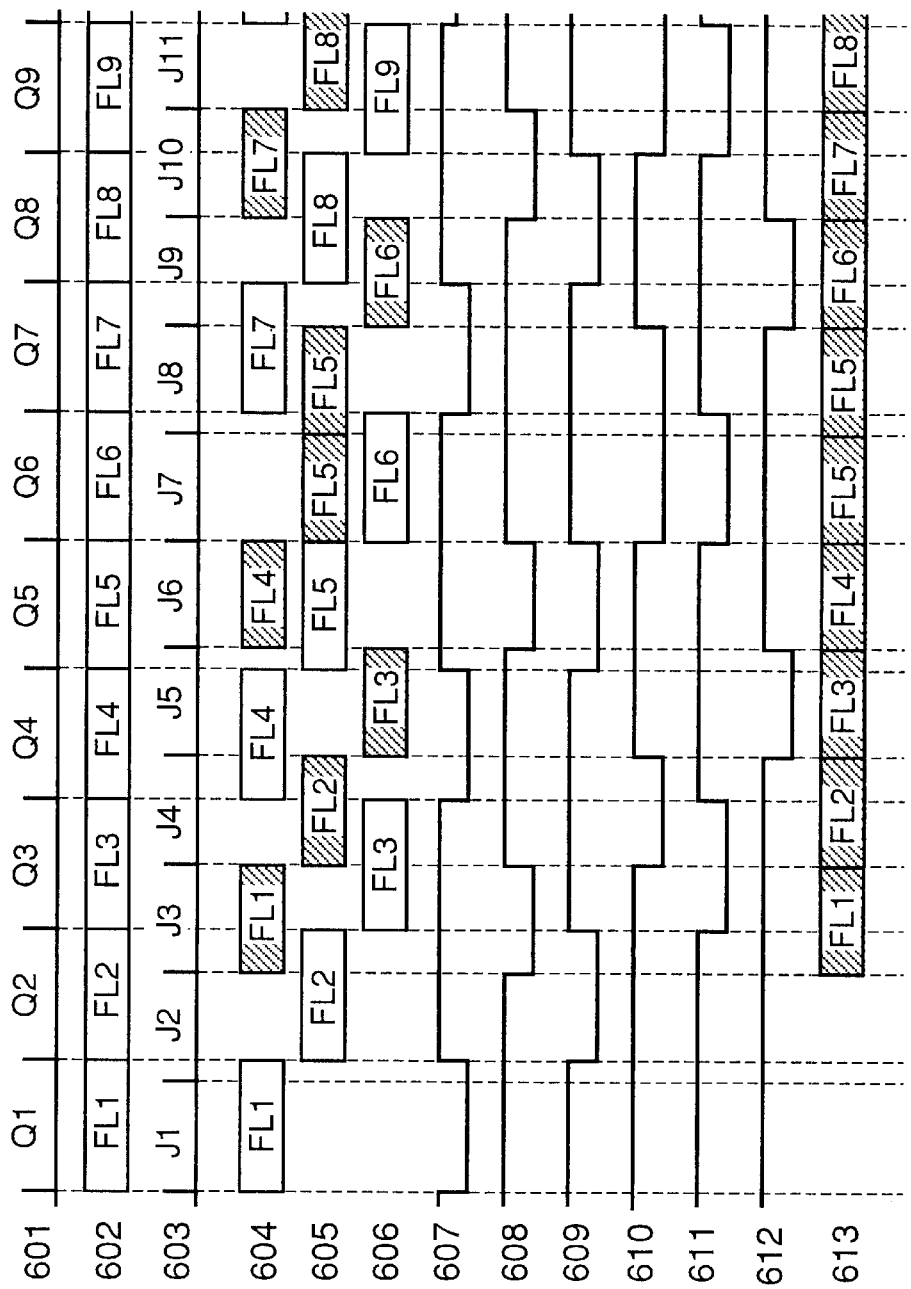
FIG. 6 is a second timing chart for explaining the operations of the image packet communications system of the second embodiment.

FIG. 6 is a second timing chart representing operations of an image packet communications system in the second embodiment. A detailed description of the operation of the communications system shown in FIG. 4 is now given with reference to FIG. 6.

In FIG. 6, reference numeral 601 denotes reception standard signals generated by the reception image clock generator 106, which is the same as item 501 in FIG. 5. The periods of the frame signals 601 are designated by symbols Q1 to Q9. Reference numeral 602 denotes the image packets transferred to the buffer group 402 from the packet receiver 107, which is the same as item 502 in FIG. 5. Reference numeral 603 denotes reference frame signals generated by the buffer controller 403 based on the reference signal REF, which is the same as item 503 in FIG. 5. The periods of the reference frame signals 603 are designated by symbols J1 to J11.

The state indicated in FIG. 6 is the opposite of the state indicated in FIG. 5, that is, the period of the reference frame signal 603 is shorter than that of the reception standard signal 601.

Reference numeral 604 indicates the write and read states to and from the first frame memory, 605 indicates the write and read states to and from the second frame memory, and 606 indicates the write and read states to and from the third frame memory. The read states are indicated by hatching in the states 604, 605, and 606.

Reference numeral 607 denotes the write enable signal W1 for the first frame memory, 608 denotes the read enable signal R1 for the first frame memory, 609 denotes the write enable signal W2 for the second frame memory, 610 denotes the read enable signal R2 for the second frame memory, 611 denotes the write enable signal W3 for the third frame memory, and 612 denotes the read enable signal R3 for the third frame memory. The enable state in all of these enabling signals is the low level. Reference numeral 613 represent the output image signals read out from the buffer group 402.

The image packets 602 are written to the frame memories, sequentially from the first to the third frame memories, by the write enable signals W1, W2, and W3, generated with reference to the reception standard signal 601. Read-out operations are executed from the frame memories, sequentially from the first to the third memories, by the read enable signals R1, R2, and R3 generated with reference to the reference frame signal 603.

Given the state represented in FIG. 6, however, the period of the reference signal frame 603 is shorter than that of the reception standard signal 601, and therefore the data being written are inadequate relative to the read-out speed. More specifically, in FIG. 6, in the period J7 the read-out operation of FL5 is finished and, in the normal state, the read-out of FL6 is started from the beginning time of J8. However, at the beginning of the period J8, the write operation of FL6 to the third frame memory has not finished, and therefore the read-out operation cannot be done. The other frame memories are also in a write-wait state.

Accordingly, the FL5 image packet read out from the second memory in the period J7 is read out again in the period J8. In other words, the state of the signal 610 (R2) in the period J8 is set at low logic (enable state) the same as that in the period J7. That is, the number of read-out image data is increased by reading the frame memory twice, thereby matching the number of data so as to agree with the reference frame signal 603. In the meanwhile, write operations are performed normally.

Next, during the period J9, FL6 is read out, putting the signal R3 (612) in the enable state, then returning to the normal read-out state.

In FIG. 5 and FIG. 6, for the sake of convenience, the periods of the reception standard signal and the reference frame signal are diagrammed as radically different examples. In actual practice, however, the difference between the periods of the reception standard signal and the reference frame signal will be very small, with the instances of frame deletion or insertion being on the order of from once every several tens of minutes to once every several hours. At this level the disruption of image quality is almost undetectable. Thus high image quality can be maintained.

By performing control such that one frame of image packet data is read out again when the writing of the image data to be read out next to all of the memories has not been completed, as described in the foregoing, time to write the image data to be read out is gained, and the image signal volume is regulated suitably to the reference frame signal.

Thus, with the second embodiment of the present invention described in the foregoing, in cases where the synchronization period of the high-speed packet network at the receiving-end terminal and the period of the reference signal differ, it is possible, by adjusting the image data volume, to create a system combining the two while maintaining high image quality.

In this embodiment, moreover, the fact that the time differential between the reception standard signal and the reference signal has exceeded a certain value is detected by the fact that either writing to or reading from the frame memories has become disabled, but the present invention is not limited to this method. It is also possible to detect this event by counting the number of clock beats in the frame periods of the reception standard signals and reference signals, and adjust the image data volume accordingly.

Third Embodiment

A third embodiment is now described with reference to FIGS. 7 to 9.

Figure 7:
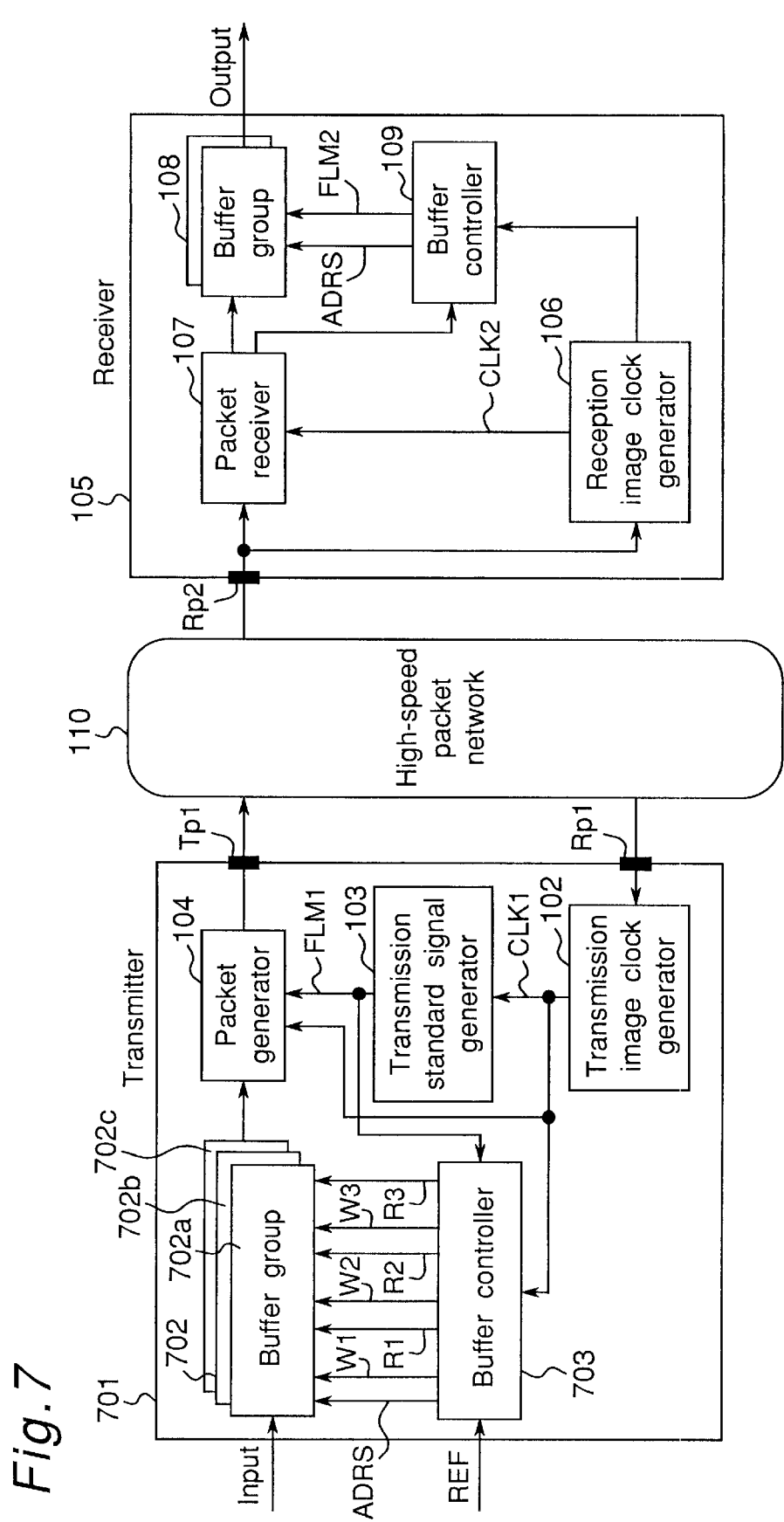
FIG. 7 is a schematic block diagram of an image packet communications system according to a third embodiment of the present invention.

FIG. 7 shows a schematic construction of an image packet communications system in a third embodiment of the present invention, where a transmitter 701 includes a transmission image clock generator 102, transmission standard signal generator 103, and packet generator 104 similarly to those indicated in FIG. 1. The transmitter 701 further includes a buffer group 702 comprising three frame memories 702a, 702b and 702c, and includes a buffer controller 703 for generating addresses (ADRS) in the frame memories storing the input image signals. The buffer controller 703 also generates write enable signals (W1, W2, W3) and read enable signals (R1, R2, R3) for the three frame memories, and control the writing and reading out operations of image packets to and from the buffer group 702.

A reference signal REF is input to the buffer controller 703 from the outside. This reference signal REF is a standard frame signal such as the composite sync signal described in the second embodiment of the present invention (cf. FIG. 4). With the system in FIG. 7, in a broadcast station where all hardware in the station is synchronized with the reference signal REF, the system corresponds to a case of sending image packets over a WAN or other packet communications network (ATM lines). The periods of the reference signal REF and the frame signals subordinately synchronized to the packet communications network are not precisely the same, but are subject to slight differences due to precision of a liquid crystal oscillator and such environmental factors as temperature. The third embodiment is designed so that a system can be built even in cases where the two periods differ.

The frame memories 702a, 702b and 702c store the received image packets, and output, in frame units, the image data stored in frames. Writing to and reading out from the frame memories are controlled based on ADRS and enabling signals for the three frame memories, namely write enable W1 and read enable R1 for the first frame memory, write enable W2 and read enable R2 for the second frame memory, and write enable W3 and read enable R3 for the third frame memory.

The high-speed packet network 110 is the same as that indicated in FIG. 1, and the receiver 105 is also the same as that indicated in FIG. 1.

The receiver 105 is indicated in FIG. 4, but the essence of the present invention is in the transmitter side, so it is not dependent on the configuration of the receiver.

Figure 8:
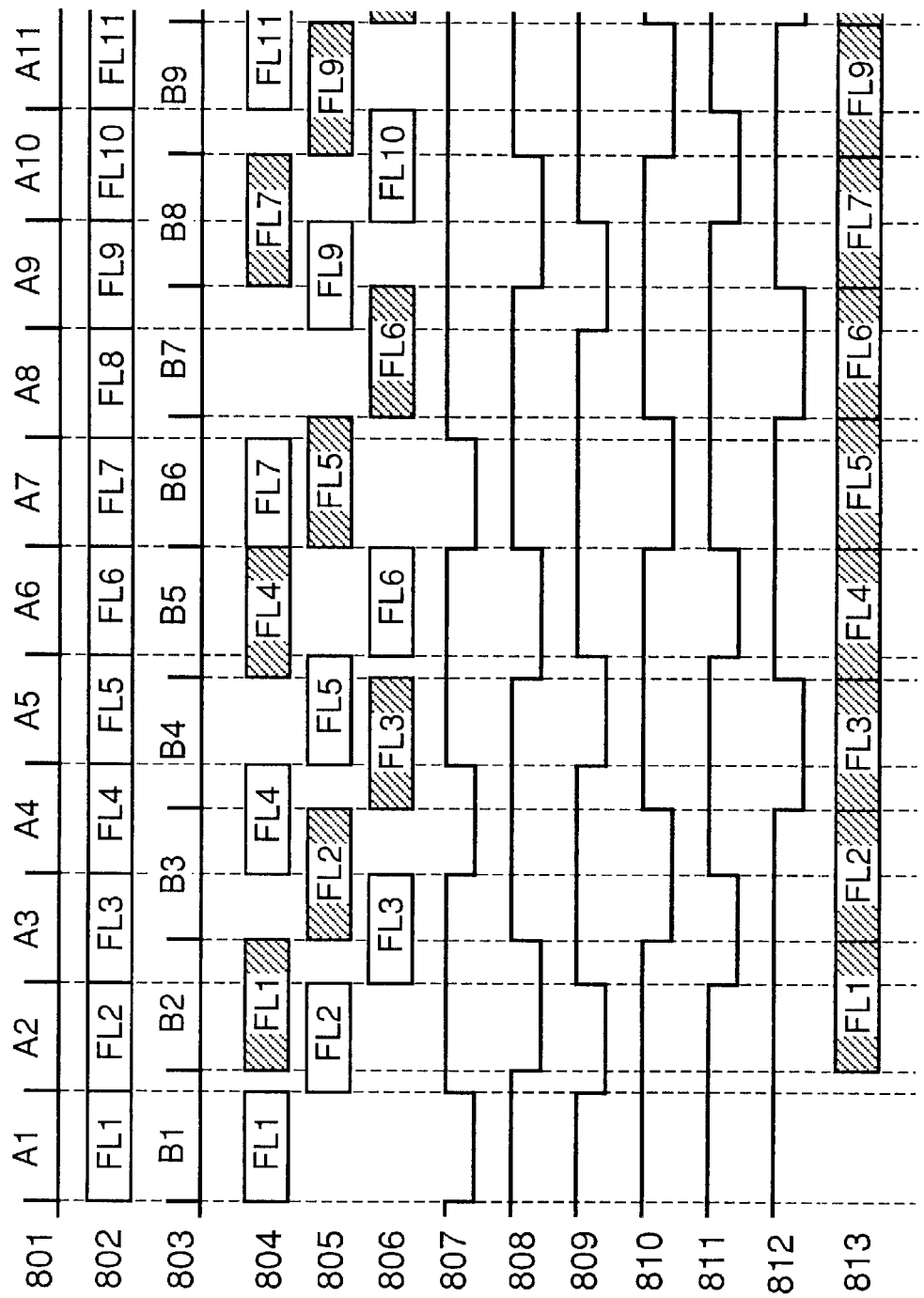
FIG. 8 is a first timing chart for explaining the operations of the image packet communications system of the third embodiment.

FIG. 8 shows a first timing chart representing operations of the image packet communications system in the third embodiment. The operations of the system diagrammed in FIG. 7 are now described in detail with reference to FIG. 8.

In FIG. 8, reference numeral 801 denotes frame signals (hereinafter, referred to as reference frame signals) generated by the buffer controller 703 based on the reference signal REF. The reference frame signals 801 can be readily generated by circuitry employing PLL and a composite sync vertical retrace interval detection circuit. The symbols A1 to A11 are designated for the frame periods of the frame signals 801. Reference numeral 802 denotes input image signals applied to the buffer group 702.

Reference numeral 803 denotes transmission standard frame signals FLM1 which is generated by the transmission standard signal generator 103, using a counter, based on a clock synchronized with the high-speed packet network 110, where the network-synchronized clock is generated by the transmission image clock generator 102. The labels B1 to B9 denotes the frame periods of the transmission standard frame signals 803. The state indicated in FIG. 8 represents a case where the period of the transmission standard signal 803 is longer than that of the reference frame signal 801.

Reference numeral 804 denotes the write and read states for the first frame memory, 805 the write and read states for the second frame memory, and 806 the write and read states for the third frame memory, where the read states are indicated by hatching.

Reference numeral 807 denotes the write enable signal W1 for the first frame memory, 808 denotes the read enable signal R1 for the first frame memory, 809 the write enable signal W2 for the second frame memory, 810 the read enable signal R2 for the second frame memory, 811 the write enable signal W3 for the third frame memory, and 812 the read enable signal for the third frame memory. The enable state in all of these enabling signals is the low level. Reference numeral 813 represents image signals read out from the buffer group 702.

The input image signals 802 are written to the frame memories, sequentially from the first to the third frame memories, by the write enable signals W1, W2, and W3 generated with reference to the reference frame signals 801. Meanwhile, the read-outs from the frame memories are performed sequentially, from the first to the third frame memories, by the read enable signals R1, R2, and R3 that are generated with reference to the transmission standard signal FLM1 803.

In the case of the state represented in FIG. 8, however, the period of the transmission standard signal 803 is longer than that of the reference frame signal 801, and therefore the read-out operation is not in time. In other words, in FIG. 8, the FL7 write operation terminates at A7, and, if in the normal state, the FL8 write state is entered at A8. The timing at the beginning of A8 overlaps the B6 period, however, and therefore, in the timing of the beginning of A8, the FL5 readout from the second frame memory has not finished, resulting in a state that the write operation cannot be performed. All of the other frame memories also are in a read-wait state. Accordingly, the FL8 image packet write operation is not performed. That is, the control is effected such that the logic of all of the write enable signals (W1, W2, W3) in the period A8 becomes high (disable state).

Next, in the period A9, since the read operation from the second frame memory has finished, so the write operation is resumed with the write enable signal W2 (809) set in the enable state. By implementing control so that image packet data of one frame is not written when all of the frame memories are in a write-disabled state, time for reading out from the frame memories is gained, and the image signal volume is adjusted so as to be suitable to the transmission standard signal.

Figure 9:
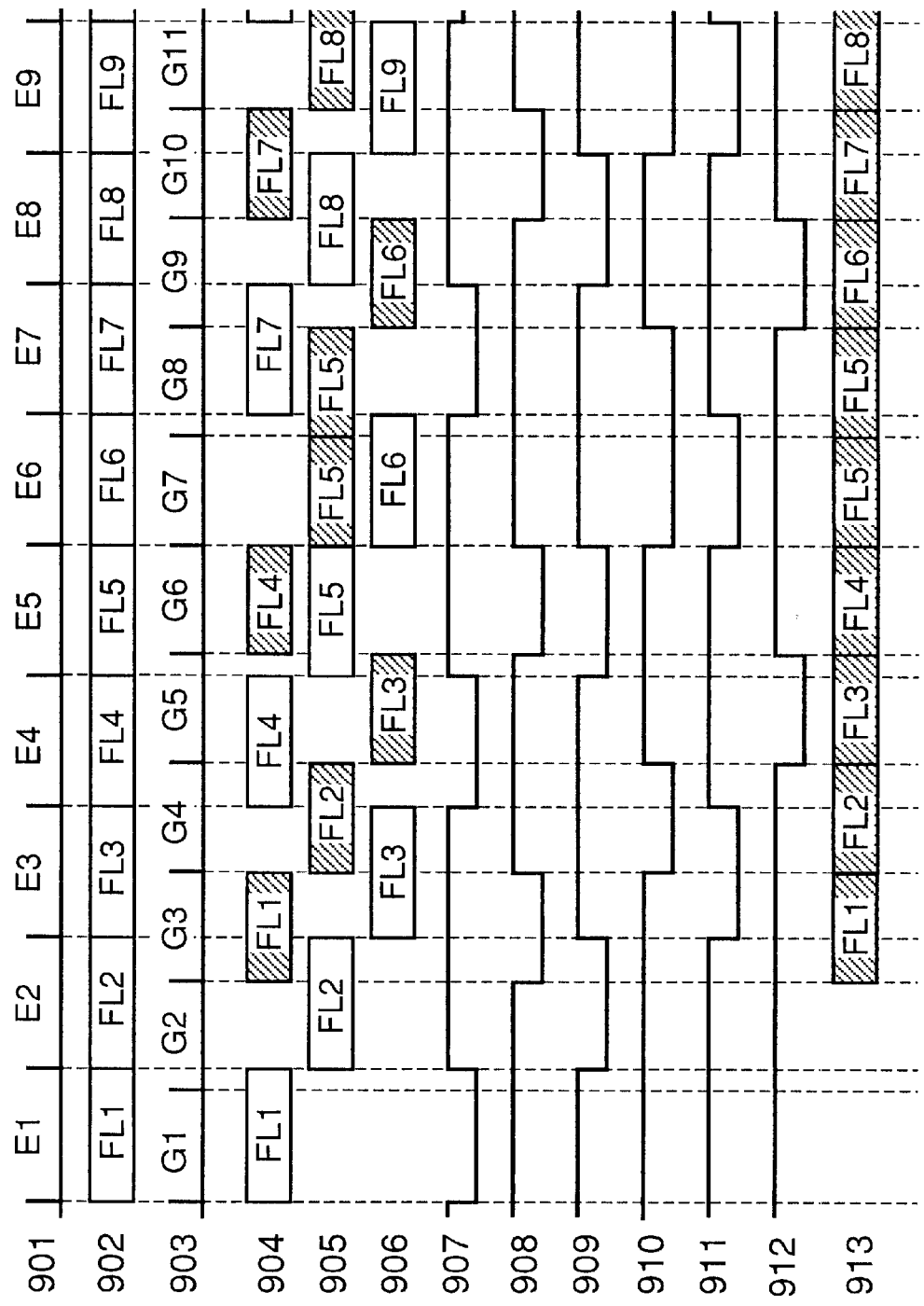
FIG. 9 is a second timing chart for explaining the operations of the image packet communications system of the third embodiment.

FIG. 9 shows a second timing chart representing operations of the image packet communications system in the third embodiment shown in FIG. 7.

In FIG. 9, items 901 are reference frame signals generated by the buffer controller 703 based on the reference signal REF, which is similar to those 801 in FIG. 8. The labels E1 to E9 are designated in the frame periods of the reference frame signals 901. Items 902 are input image signals input to the buffer group 702, as those 802 in FIG. 8. Items 903 are transmission standard signals generated by the transmission standard signal generator 102, as those 803 in FIG. 8. The labels G1 to G11 are noted in the frame periods of the transmission standard signals 903. The state represented in FIG. 9 represents the case where the period of the transmission standard signal 903 is shorter than that of the reference frame signal 901.

Reference numeral 904 indicates the write and read states for the first frame memory, 905 the write and read states for the second frame memory, and 906 the write and read states for the third frame memory. The read states are indicated by hatching in the states 904, 905, and 906.

Item 907 is the write enable signal W1 for the first frame memory, 908 the read enable signal R1 for the first frame memory, 909 the write enable signal W2. for the second frame memory, 910 the read enable signal R2 for the second frame memory, 911 the write enable signal W3 for the third frame memory, and 912 the read enable signal R3 for the third frame memory. All of the enable signals are in the enable state at the low level. Reference numeral 913 denotes the image signals read out from the buffer group 702.

The input image signals 902 are written to the frame memories, sequentially from the first to the third frame memories, by the write enable signals W1, W2, and W3 generated with reference to the reference frame signal 901. Read-outs from the frame memories, on the other hand, are made sequentially from the first to the third frame memories, by the read enable signals R1, R2, and R3 generated with reference to the transmission standard signal 903.

In the case represented in FIG. 9, however, the period of the transmission standard signal 903 is shorter than that of the reference frame signal 901. Therefore, there is insufficient write data relative to the read-out speed. In other words, in FIG. 9, the read operation FL5 is finished in G7, and, if in the normal state, the read-out FL6 starts at the beginning time the period G8. However, the time of the start of the G8 period overlaps the end portion of the period E6, and since the write operation FL6 to the third frame memory is not finished, so the read-out is not possible. The other frame memories are also in a write-wait state.

Accordingly, the FL5 image packet read out from the second frame memory in the period G7 is read out again in the period G8. In other words, the logic of the 910 signal (R2) is made low (enable state) in the G8 time, just as in the J7 time. That is, the number of image data read out is increased by reading the frame memory twice, rendering that number agreeable to the transmission standard signal 903.

Next, in the period G9, since the write operation FL6 to the third frame memory is finished, so the read enable signal R3 (912) is put in the enable state and read-out is resumed. Thus, by rereading the image packets of one frame when all of the frame memories are in a read-disabled state, the time for writing is gained, and the image signal volume is adjusted so as to be agreeable with the transmission standard signal.

In FIG. 8 and FIG. 9, to facilitate the explanation, the periods of the reception standard signal and the reference frame signal are shown as radically different. In actual practice, however, the difference between the periods of the reception standard signal and the reference frame signal will be very small, with the instances of frame deletion or insertion being on the order of from once every several tens of minutes to once every several hours. At this level the disruption of image quality is almost undetectable.

In this embodiment, the fact that the time differential between the transmission standard signal and the reference frame signal has exceeded a certain value is detected by the fact that writing to the frame memories has become disabled, but the present invention is not limited to this method. It is also possible to detect this event by counting the number of clock beats in the frame periods of the transmission standard signals and reference frame signals.

With the third embodiment of the present invention, even when the synchronization period of the high-speed packet network and the period of the reference signal differ, it is possible to build a system combining the two, while maintaining high image quality, by adjusting the image data volume.

In this embodiment, moreover, the fact that the time differential between the transmission standard signal and the reference signal has exceeded a certain value is detected by the fact that either writing to or reading from the frame memories has become disabled, but the present invention is not limited to this method. It is also possible to detect this event by counting the number of clock beats in the frame times of the transmission standard signals and reference signals, and adjusting the image data volume accordingly.

Fourth Embodiment

A fourth embodiment is now described with reference to FIG. 10.

Figure 10:
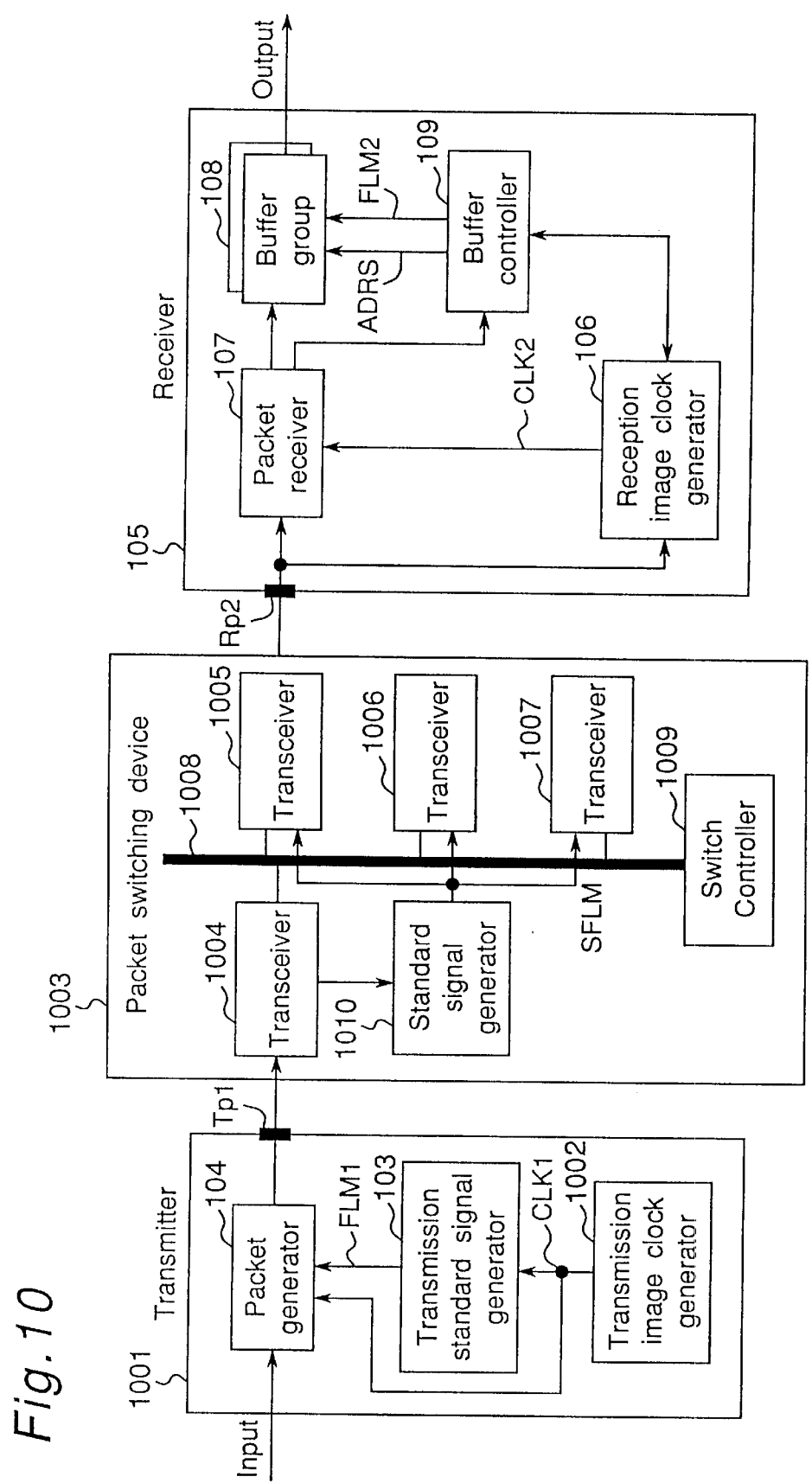
FIG. 10 is a schematic block diagram of an image packet communications system according to a fourth embodiment of the present invention.

FIG. 10 shows a schematic construction of an image packet communications system in the fourth embodiment of the present invention.

In FIG. 10, a transmitter 1001 is fed with input image signals, where the input image signals are converted to packets (ATM cells) and the resultant ATM cell packets are sent out on an ATM network. The transmitter 1001 includes a transmission image clock generator 1002, transmission standard signal generator 103, and packet generator 104. The transmission standard signal generator 103 and packet generation means 104 are the same as those of the first embodiment shown in FIG. 1. The receiver is the same as the of the first embodiment shown in FIG. 1.

Reference numeral 1003 denotes a packet switching device. A packet network is ordinarily comprised of one or a plurality of packet switching devices. In the example shown in FIG. 10, the packet network is configured with a single packet switching device for brevity. In the embodiments of the present invention, an ATM network is used as an example of a high-speed packet network, so the packet switching device 1003 is here assumed to be an ATM switch.

The transmitter 1001 and the receiver 105 are connected through the packet switching device 1003. In the embodiments of the present invention, ATM communications are assumed to have SONET standard used as the specification of the physical level. Accordingly, the packet switching device 1003 is operated synchronously with SONET frames.

In FIG. 10, Tp1 indicates a transmission port for connecting from the transmitter 1001 to the packet switching device 1003, while Rp2 indicates a reception port connecting to the receiver 105 from the packet switching device 1003. ATM communications are full duplex communications, and the ports are equipped as sending and receiving ports. The receiving port corresponding to Tp1 and the sending port corresponding to Rp2 are not shown in FIG. 1.

In the transmitter 1001, the transmission image clock generator 1002 generates a transmission image clock CLK1. The transmission standard signal generator 103 generates a signal synchronization frame signal FLM1 based on the transmission image clock CLK1.

The packet generator 104 generates image packets from the input image signals, based on the timing of CLK1, with reference to the frame signal FLM1 as the frame standard, and attaches image packet headers thereto, and send them out on the network from the port Tp1, using SONET frames.

The packet switching device 1003 includes first to fourth transceiver units 1004, 1005, 1006, and 1007. The transceiver units are not limited to four units but may be provided in any number. Reference numeral 1008 denotes an internal bus provided in the packet switching device 1003 for handing data back and forth between the transceiver units. Reference numeral 1009 constitutes a switching device controller for controlling the transmission of data over the internal bus. Reference numeral 1010 constitutes a switching device standard signal generator.

The transceiver units 1004, 1005, 1006, and 1007 perform transmissions for each port. The handing of data back and forth between the ports inside the packet switching device 1003 is handled by the switching device controller 1009 controlling the transmission of data via the internal bus 1008.

The switching device standard signal generator 1010 detects SONET frames of any transceiver units and generates switching device standard signals (SFLM) subordinately synchronized to the SONET frames. Next, the switching device standard signals SFLM are distributed to each transceiver units, to thereby operate the transceiver units synchronously with the SONET frames.

In the example shown in FIG. 10, the switching device standard signal generator 1010 has selected the first transceiver 1004 as a reference one in order to effect subordinate synchronization, so that the transceiver units 1005, 1006, and 1007 are subordinately synchronized with the switching device standard signal SFLM generated internally by the switching device standard generator.

By configuring the packet switching device 1003 as described above, the transceiver units can be operated in a synchronization state with SONET frames.

The receiver 105 is the same as that of the first embodiment shown in FIG. 1, attaining the subordinate synchronization with the signals referenced to the SONET frames input through the Rp2 port.

With the configuration described in the foregoing, the transmitter 1001, packet switching device 1003, and receiver 105 are all synchronized with reference to the SONET frames, thereby facilitating image communications where a synchronization relation is guaranteed. Accordingly, each image frame can be definitely transmitted and high image quality can be maintained in the communications. The means for subordinately synchronizing the terminals and switching equipment to SONET frames can be easily implemented using such as PLL circuitry.

The internal configuration of the packet switching device in the embodiment of the present invention, as here exemplified, use buses in transferring data to and from the transceiver units, but there are various other ways in which the packet switching device can be internally configured. However, the essence of the present invention is not dependent on the internal configuration of the packet switching device. Accordingly, the scope of this invention is not exceeded by the use of some other switching method.

Furthermore, the method of synchronizing the transceiver units inside the packet switching device described here employs SONET frames. However, in cases where the phase relationship of the SONET frames of the transceiver units or of the image frames is not a problem, it is permissible to implement new synchronization in the SONET frames based on a clock implemented with PLL.

In the example of this embodiment shown in FIG. 10, the terminals and the packet switching device are synchronized with reference to the transmitter terminal. However, the terminals and the packet switching device usually have a clock that is generated internally, and all of the devices are connected in full duplex, so it is also permissible to subordinately synchronize all of the devices to any terminal or packet switching device.

In the example shown in FIG. 10, the packet switching device is used as a single unit. In cases where a plurality of packet switching devices are used, one switching unit may be selected as the standard reference one and the other switching devices are connected so as to be subordinately synchronized thereto.

Fifth Embodiment

A fifth embodiment is now described with reference to FIGS. 1 and 11.

The configuration of the fifth embodiment is the same as that of the first embodiment shown in FIG. 1.

In ATM communications, in general, there is a problem of occurrence of fluctuation. This fluctuation occurs because delay times are not constant throughout the transmission path. There are many causes for this problematic fluctuation as following:

(1) Transmission requests competing with cells generated from other connections and containing OAM information;

(2) Synchronization to cell lead positions on the transmission path;

(3) A plurality of connections being multiplexed through multiplexers.

The generation of fluctuations is a phenomenon widely known to those in the art as a problem which cannot be avoided in ATM communications.

Due to the generation of fluctuations, when the transmitter terminal 101 passes cells from the ATM layer to the physical layer, the cell transmission period at the ATM layer is preserved as is and there is no reception at the receiver terminal 105. More specifically, in the case of image communications, it is particularly necessary that the definite transmission of a determined volume of data within a frame period be guaranteed. As is well known in the art, when that guarantee is not fulfilled, image destruction and other problems arise.

In ATM communications, it is not possible to eliminate the occurrence of fluctuation, but it is possible to establish parameters and cell delay variation (CDV) allowances that are regulative of how much fluctuation can be tolerated. In the ATM Forum negotiations on the QoS parameter established in UNI 4.0, by making request to the ATM network, the CDV value can be set at the time the ATM connection is confirmed, thereby requesting the network to have fluctuations accommodated within the cell delay variation allowance. The connection is then confirmed when the network is able to secure a transmission path satisfying the request.

Figure 11:
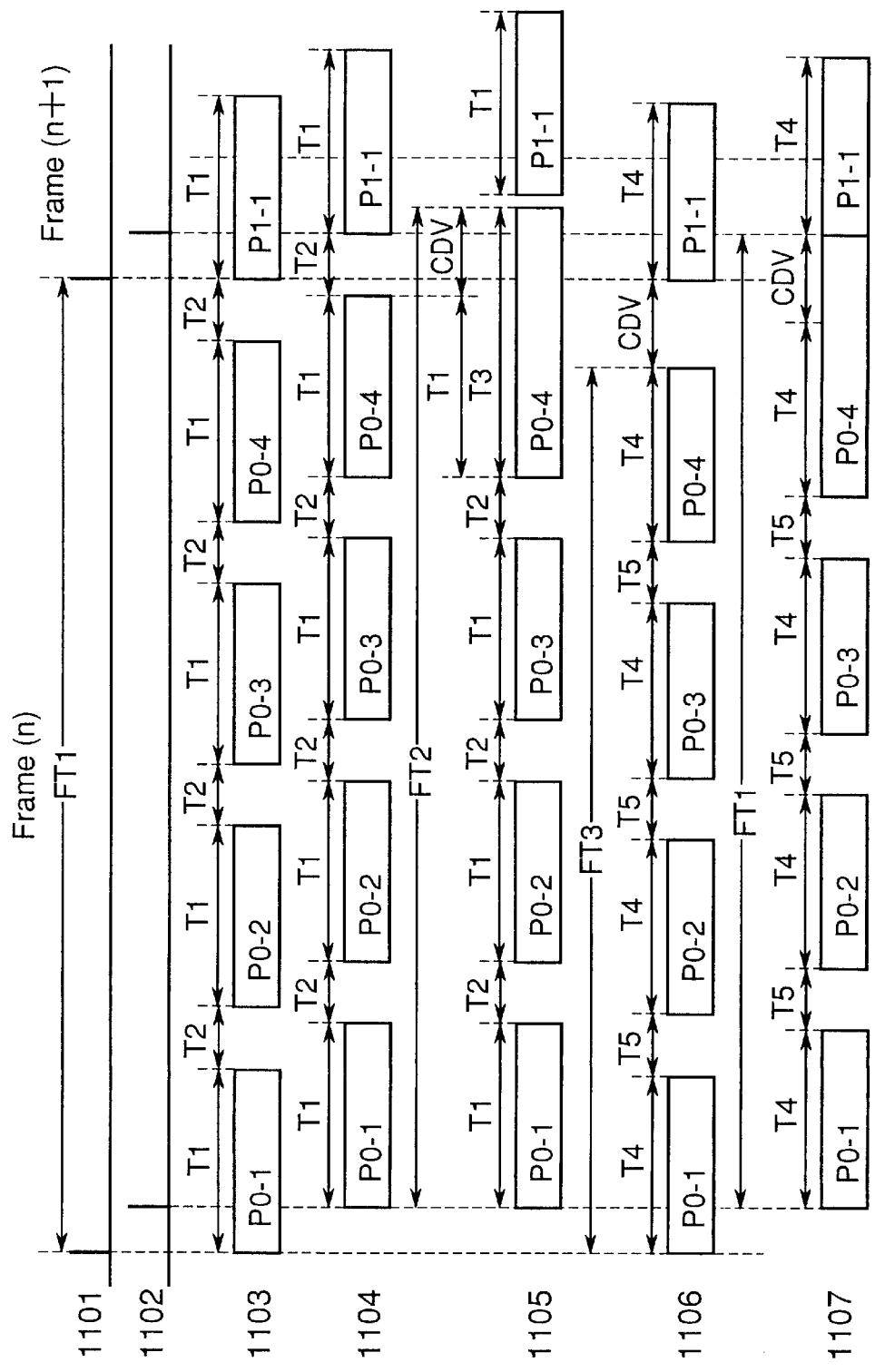
FIG. 11 is a timing chart for explaining a fifth embodiment of the present invention.

With reference to FIG. 11 showing a timing chart for the fifth embodiment, the problems arising in image communications due to fluctuation are explained, and a method of resolving those problems is described.

In FIG. 11, reference numeral 1101 denotes a transmission synchronizing frame signal FLM1 in the transmitter 101. Reference numeral 1102 denotes a reception synchronizing frame signal FLM2 inside the deceiver 105. In FIG. 11, however, in order to make a comparison with FLM1 1101, this has been rewritten as a signal that generates a pulse at the leading edge of the frame.

Item 1103 is a transmission packet sent from the transmitter 101, 1104 is a transmission packet received by the receiver 105 when there is no fluctuation, and 1105 is a transmission packet received by the receiver 105 when there is fluctuation. Reference numeral 1106 denotes a transmission packet sent from the transmitter 101 according to the fifth embodiment of the present invention, and 1107 denotes a transmission packet received by the receiver 105 when there is fluctuation, according to the fifth embodiment of the present invention. In the example illustrated in FIG. 11, one frame of image signals is sent in four transmission packets, but the invention is not limited thereto.

As to the transmission packet 1103, four transmission packets are sent, each with a period of T1, and with the interval between two adjacent transmission packets being T2. When there is no fluctuation, but there is transmission delay, as indicated in the transmission packet 1104, data pieces are received at the same intervals as those of the transmission packet 1103. Accordingly, image quality is guaranteed because image data are normally received in one frame interval.

In the case 1105 where fluctuation has developed. the example is represented where fluctuation has occurred only in the P0-4 transmission packet. Each transmission packet is sent after being divided into a plurality of ATM cells. Therefore, when fluctuation occurs, the delay in cell arrival intervals ceases to be constant, and the arrival of one or more cells is greatly delayed. That being so, as indicated in the case 1105, at the receiver terminal, looking at the times of the transmission packets arrival, the case frequently arises where this becomes a larger time period T3 (T3>T1), as indicated for P0-4. In the case 1105, if the maximum cell delay variation (CDV) occurs in the last cell in the transmission packet, then we have a following resultant:

$$T3 = T1 + CDV$$

If the CDV value at this time is greater than T2, then the reception time FT2 for 1105 becomes greater than one frame time. Accordingly, the receiver 105 cannot receive one frame of image signals within one frame period, resulting in the destruction of the image.

In the fifth embodiment, in the case of the transmission packet 1106, the data transmission timing at the transmitter is made such that the sending of the transmission packet is concluded within a time period (FT3) that is obtained by subtracting the CDV value from one frame period (FT1), represented as follows.

$$FT3 = FT1 - CDV$$

In the case 1106, within the time period FT3, each of the transmission packets is sent within the time interval T4, with an interval T5 separating the adjacent two transmission packets one from another.

Reference numeral 1107 represents the reception timing at the receiver 105 when the transmission packets are sent based on the timing 1106 from the transmitter with occurrence of fluctuation. In this case, fluctuation is represented as occurring in P0-4, similar to the case 1105.

With the fifth embodiment, the reception time for the final transmission packet P0-4, even when this final cell P0-4 generates the maximum cell deviation (CDV), becomes as follows:

$$T4 + CDV$$

where the receiving of the four transmission packets is completed within the period FT1. Accordingly, no image destruction occurs even when the maximum delay fluctuation occurs.

The actual configuration of the fifth embodiment can be easily implemented by providing a counter for counting the frame periods inside the packet generator 104 in FIG. 1, and transmitting the transmission packets with the transmission timing described above.

By implementing the fifth embodiment as described in the foregoing, an image packet communications system can be provided which maintains high image quality, with no destruction of images even when fluctuation occurs on the high-speed packet network.

Moreover, the delay fluctuations are not something that the transmission packets mutually influence, and therefore, it is only necessary to consider the transmission time for the leading cell in the transmission packet at the head of each frame and the final cell in the final transmission packet. The essential point of the present invention is in transmitting the transmission packets contained in one frame period within a period that is obtained by subtracting the value of the maximum delay fluctuation from one frame period value.

Accordingly, so long as this essential point is not compromised, the number of transmission packets may be set at any number (although, in this embodiment, the number of transmission packets is set at 4) without exceeding the scope of the present invention. Similarly, the transmission times for the transmission packets are here made the same, as are the intervals between the transmission packets, but these may be set at any value without exceeding the scope of the present invention.

Furthermore, the value subtracted from one frame time may be any value whatever so long as it is equal to or greater than the value of the maximum delay fluctuation.

In this embodiment, moreover, the example described is one in which the sending timing is controlled at the transmission packet processing layer, but the scope of the present invention will not be exceeded even though the sending timing be controlled at another layer such as the ATM layer.

In all of the embodiments of the present invention, a packet switching system is taken as the example in the descriptions. However, so long as the same reference signal can be used at the sending end and the receiving end, the invention is not limited to packet switching systems, but is of course effective for use in line switching systems and local area networks (LANs), for example.

The present invention, as described in the foregoing, provides the following remarkable effects.

According to the first aspect of the present invention, transmissions are conducted with a clock subordinately synchronized to the network clock and frame signals generated based on the clock established as the synchronization standard at the transmitter terminal, and in the meanwhile, transmissions are conducted with a clock subordinately synchronized to the network clock and frame signals generated based on the clock established as the synchronization standard at the receiving-end terminal, thus affording the benefit of being able to build a communications system where the synchronization between the transmitter end and the receiver end can be guaranteed.

Furthermore, the image packets are transmitted after attaching image packet headers thereto, wherefore, even when a packet loss or error occurs in the network, and a transmission packet is lost, that transmission packet error has no effect on the other transmission packets, and normally received transmission packets are securely received and output. Accordingly, an effect is afforded in that high image quality can be maintained in the transmissions even when packet losses or errors occur.

According to the second aspect of the present invention, when the synchronization period of the network clock in the high-speed packet network differs from the period of the reference signal at the receiver side, it is possible to adjust the image data volume so that the image data received from the network are made suitable to the reference signal period. Accordingly, it is possible to build systems wherein equipment synchronized to the network clock is connected to equipment synchronized to the reference signal, thereby affording the effect of being able to guarantee frame synchronization for all equipment in the system.

According to the third aspect of the present invention, when the synchronization period of the network clock in the high-speed packet network differs from the period of the reference signal, the volume of image data can be adjusted so that the image data input synchronized to the reference signal are made suitable to the period of the network clock. This makes it possible to interconnect equipment synchronized to the reference signal and equipment synchronized to the network clock, thus affording the effect of being able to guarantee the frame synchronization of all equipment in the system. The image data volume is adjusted in frame units, so that high image quality can be preserved.

According to the fourth aspect of the present invention, it is possible to build an image packet communications system assuring the frame synchronization of all equipment included in the transmitter, the high-speed packet network, and the receiver, thereby affording the effect of maintaining high image quality.

According to the fifth aspect of the present invention, the image data in each frame are transmitted without fail within the frame period, even when fluctuations occur in the high-speed packet network, thereby affording the effect of realizing an image packet communications system assuring high image quality.

The first, second, third, fourth, and fifth aspects of the present invention all afford the benefit of being realizable in a simple configuration. Furthermore, the present invention can be implemented without detecting any kind of signal from the data, thus providing the benefit of being applicable irrespective of the data being communicated.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An image packet communications system for communicating image data information in real time between a transmitter side and a receiver side through a network, said communications system comprising a transmitter and a receiver, wherein said transmitter comprises:
a transmission clock generator for generating a transmission clock signal subordinately synchronized to a given reference clock signal;
a packet generator for generating image packets from input image signals based on the transmission clock signal; and
a transmission standard signal generator for generating a transmission standard signal based on the transmission clock signal and for generating the image packets with image packet headers attached thereto to produce transmission packets with reference to the transmission standard signal, wherein said receiver comprises:
a reception clock generator for generating a reception clock signal subordinately synchronized to the given reference clock signal, so that the reception clock is synchronized with the transmission clock signal;
a buffer memory group;
a packet receiver receiving the image packets with a network delay to be stored in said buffer memory group; and
a buffer controller for generating a reception standard signal as a control signal for controlling writing and reading of the image packets to and from said buffer memory group, based on the reception clock signal, wherein said packet receiver is comprised of a separator means for separating the image packets and the image packet headers from each other so that said buffer controller is capable of generating an address signal based on information of the image packet headers supplied from said packet receiver.

2. The system as claimed in claim 1, wherein said buffer controller is arranged so as to be supplied with an external reference signal as a frame standard signal, and wherein said buffer controller is capable of controlling the writing and reading of the image packets to and from said buffer memory group such that image data output from said buffer memory group has a sufficient volume for the external reference signal when a time differential between the reception standard signal generated based on the reception clock signal and the external reference signal input exceeds a predetermined value.

3. The system as claimed in claim 2, wherein the system is operable to determine that the time differential between the reception standard signal and the external reference signal has exceeded a predetermined value when the control signal from said buffer controller for either writing to or reading from said buffer memory group is disabled.

4. The system as claimed in claim 1, wherein said transmitter further comprises:

a buffer memory group for storing the input image signals; and a buffer controller for controlling writing and reading of the image signals to and from said buffer memory group, wherein said buffer controller is arranged so as to be supplied with an external reference signal as a frame standard signal, and wherein said buffer controller is capable of controlling the writing and reading of the input image signals to and from said buffer memory group such that image data output from said buffer memory group has a suitable volume for the reference signal when a time differential between the transmission standard signal generated by said transmission standard signal generator and the external reference signal exceeds a predetermined value.

5. The system as claimed in claim 1, further comprising a network connecting said transmitter to said receiver, said network comprising at least one packet switching device, wherein each packet switching device comprises:

a plurality of transceivers for transmitting and receiving image data packets; and a switch standard signal generator for selecting a selected transceiver from among said plurality of transceivers, and for generating switch standard signals from the image packet signals received by said transceiver, such that the switch standard signals are subordinately synchronized to the transmission standard signal generated by said transmission standard signal generator, thereby subordinately synchronizing said selected transceiver to the transmission standard signal, and such that the transmission packets are transmitted to the network with the timing subordinately synchronized to the transmission standard signal.

6. The system as claimed in claim 5, wherein said switch standard signal generator is operable to detect SONET frames of any of the transceivers, to generate switch standard signals subordinately synchronized to the SONET frames, and to distribute the switch standard signals to each transceiver, to thereby operate the transceivers synchronously with the SONET frames.

7. The system as claimed in claim 1, wherein said packet generator is operable to complete transmissions of the image packets and packet headers belonging within a period of the transmission standard signal, within a time period obtained by subtracting a maximum network fluctuation from the transmission standard signal.

8. The system as claimed in claim 7, further comprising a counter for counting the frame periods inside said packet generator, thereby enabling transmission of the transmission packets contained in one frame period within a period that is obtained by subtracting the value of a maximum delay fluctuation from one frame period.

* * * * *